Patented Nov. 22, 1927.

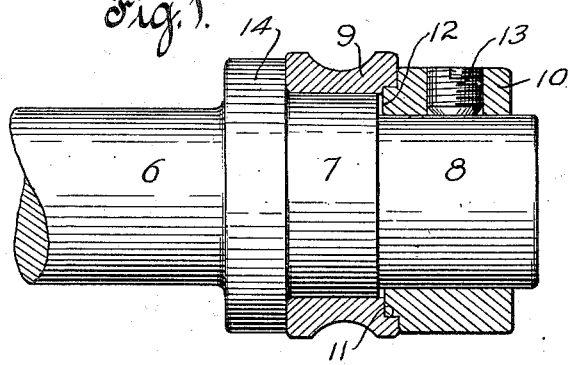
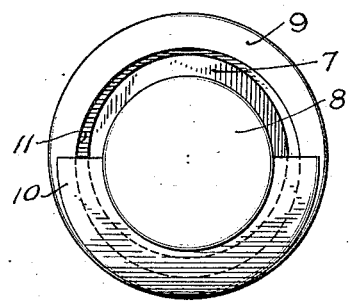
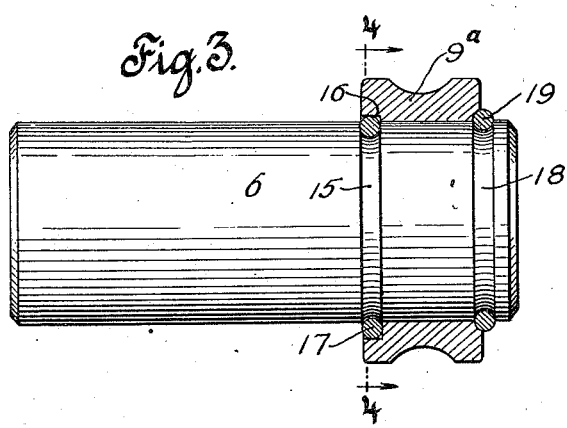
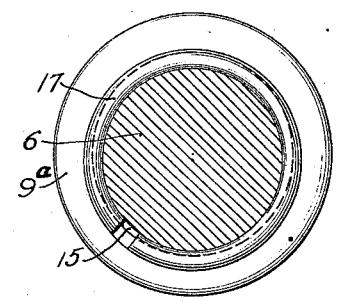
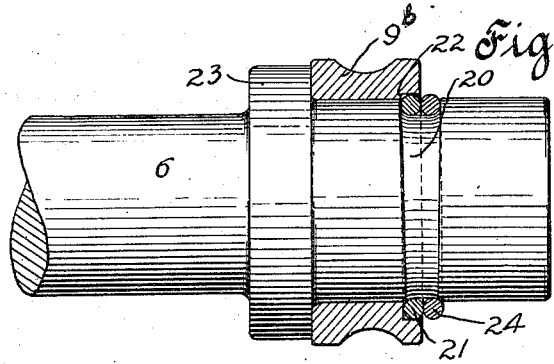

1,650,573

UNITED STATES PATENT OFFICE.

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

SELF-LOCKING DRIVE COLLAR.

Application filed February 7, 1925. Serial No. 7,639.

My invention relates to means for locking a collar, ring, or the like to a shaft and is particularly, though not exclusively, adapted for locking the inner bearing ring of an antifriction bearing to a shaft.

It is the principal object of the invention to provide a simple means for locking a collar on a shaft which can be manufactured at relatively small cost and which will hold the collar securely in place against rotation.

In the drawings, which show for illustrative purposes only, preferred forms of the invention:

Fig. 1 is a fragmentary view of a shaft and locking means illustrating one embodiment of the invention;

Fig. 2 is an end view of the device shown in Fig. 1, a part being broken away;

Fig. 3 is a view similar to Fig. 1 and illustrating a modification;

Fig. 4 is a sectional view taken substantially in the plane of the line 4—4 of Fig. 3;

Fig. 5 is a view similar to Fig. 3 and illustrates still another modification.

6 indicates a shaft to which a collar is to be secured. 7—8 designate parts of the shaft which are eccentric to each other. 9 designates a collar which in the form shown is an inner ring of a ball bearing, this collar being seated upon the part 7 of the shaft. The collar 9 is locked to the shaft by means of a second ring or collar 10 on the eccentric portion 8 of the shaft, as will be later described. In the form shown, the ring 9 has a counter bored portion 11 which is eccentric to the bore which fits upon the shaft portion 7 as will be clear from Figs. 1 and 2. The collar 10 is provided with a projecting lug portion 12 which fits within the counterbore 11 of the ring 9 and this projection is preferably concentric with the bore through the collar 10.

It will now be clear that, with the collars 9 and 10 in engagement with each other, as shown in Figs. 1 and 2, if the collars are rotated slightly, relatively to each other, the eccentric formation of the shaft and of the interfitting parts on the collars will cause the two collars to bind or lock tightly to each other and will cause the two rings or collars to be tightly wedged and held to their respective shaft portions.

In order to preclude the possibility of the collars slipping on the shaft portions before the same become tightly locked, I may secure or anchor one of the collars to the shaft portion by suitable means such as a set screw 13. The set screw also performs the additional function of positioning the collar 10 longitudinally on the shaft portion 8 and by this means the ring 9 is prevented from moving endwise on the shaft in one direction. It should be understood that the set screw 13 is not what causes the ring 9 to be held or wedged on the shaft, since the wedging or holding action is caused by the eccentric interfitting parts between the two collars and shaft and the set screw 13 is more in the nature of a precautionary measure. If desired, means such as a collar or flange 14 may be provided on the shaft so as to prevent movement of the ring 9 in the opposite direction or toward the left as viewed in Fig. 1.

In the form of the invention shown in Figs. 3 and 4 the eccentric portions on the shaft are formed by cutting a groove 15 therein, which groove is deeper at one side than at the other, in other words, the groove 15 is cut eccentrically to the outer surface of the shaft. The ring $9^a$ in this instance fits on the main portion of the shaft and has a counterbored portion 16 which fits over the collar 17, positioned in the eccentric groove 15. One of the collars is eccentrically formed and in the modification shown in Figs. 3 and 4, the counter bored portion 16 is made eccentric to the bore through the ring and the collar 17 may in this instance have its inner and outer surfaces concentric. For the sake of cheapness and ease of manufacture, it is preferred to make the collar 17 of wire, or the like, which may be split as shown particularly in Fig. 4, for the purpose of rendering application of the ring to the shaft easy.

It will be clear that with this form of the invention, as with the form last described, it is only necessary to rotate the collars relatively to each other slightly in order to cause both collars to lock to the shaft and to each other.

With the parts proportioned as disclosed in Fig. 3, the ring or collar 17 will prevent sliding of the ring $9^a$ on the shaft in one direction. If desired, other means may be provided for positioning the collar $9^a$ on the shaft for preventing longitudinal sliding in the opposite direction. As one means for accomplishing this purpose, the shaft 6 may be grooved as indicated at 18 and a split ring or collar 19 may be snapped into this groove so that endwise movement of the ring $9^a$ toward the right as viewed in Fig. 3 will be prevented.

In the modification disclosed in Fig. 5, the shaft has an eccentrically formed groove 20, which in this case is made relatively wider than would be necessary for a single collar fitting therein, for a purpose to be described. The collar $9^b$ is fitted on the shaft 6, while the collar 21, which may be a split wire ring, fits in the eccentric groove 20. The interfitting parts between the rings $9^b$ and 21 may be eccentrically formed and I prefer to turn out an eccentric counterbore 22 in the ring $9^b$, which counterbore fits over the collar 21, as in the two previously described forms. It will be obvious that a slight relative rotation between the rings $9^b$ and 21 will cause the same to be tightly wedged or held to the shaft and to each other.

If desired, endwise movement of the ring $9^b$ toward the left, as viewed in Fig. 5, may be prevented by suitable means such as the flange or fixed collar 23 on the shaft. An endwise positioning collar which may be in the form of a split ring 24 may be seated in the relatively wide groove 20 and may abut the locking collar 21 so as to hold the same, and consequently prevent endwise movement of the ring $9^b$ toward the right, as viewed in Fig. 5.

In each of the forms shown, the shaft is provided with two eccentric portions and a collar is seated on each of these portions. While I have described the locking function as being performed by a slight relative rotation between the two collars, in each instance it will, of course, be understood that the locking function would be performed equally well by holding one of the collars and rotating the shaft, and I wish to cover such an alternative action.

While the invention has been described in some detail and several possible embodiments shown, I do not wish to be confined to the forms illustrated, since other modifications may be made within the scope of the invention as defined in the appended claim

I claim:

In a device of the character described, a shaft having an eccentric seat formed directly thereon, a ring fitting on said shaft and having a counterbored portion at one end eccentric to the bore therethrough, said counterbored portion surrounding said eccentrically formed seat on said shaft, a second ring on said eccentrically formed seat on said shaft and extending within and fitting said counterbored portion, and means on the shaft engaging said first mentioned ring at the end opposite said counterbored portion for maintaining the counterbored portion around said second ring.

RAYMOND R. SEARLES.